Patented June 3, 1930

1,762,128

UNITED STATES PATENT OFFICE

EDGAR B. CARTER, OF INDIANAPOLIS, INDIANA, ASSIGNOR, BY MESNE ASSIGNMENTS, TO ELI LILLY AND COMPANY, OF INDIANAPOLIS, INDIANA, A CORPORATION OF INDIANA

EPHEDRINE INHALANT AND PROCESS OF PRODUCING SAME

No Drawing. Application filed July 23, 1928. Serial No. 294,943.

The object of my invention is to produce an ephedrine inhalant which will be acceptable both in physiological effect and in appearance. To that end my invention comprises not only the product as a compound, but also the method of production whereby a clear solution of definitely predeterminable ephedrine content is economically obtained.

My improved product is a clear, transparent solution of ephedrine alkaloid in a light mineral oil to which is added oil of rose and, preferably, an oil-soluble red dye which is inactive upon mucous membranes.

Ephedrine alkaloid in its ordinary commercial form is somewhat readily soluble in mineral oils, as would naturally be expected, but when such a solution is made by common and usual methods it is opalescent and turbid instead of clear and transparent and when used as an inhalant is somewhat unpleasant though effective in reducing congestion in the capillaries.

I have discovered that the turbidity of such a solution is not due to any incompleteness of solution of the ephedrine but is due to the presence, in the solution, of any percentage of water in the ephedrine alkaloid.

I have discovered that a perfectly complete and clear solution may be obtained by removing all trace of water from the alkaloid before association with the mineral oil but such a procedure, while effective in the production of a clear and transparent solution, is exceedingly costly and thus necessitates a comparatively high selling price.

I have also discovered that a perfectly clear and transparent solution may be obtained without complete initial drying of the ephedrine by first reducing its water content sufficiently to bring it to approximately 97% purity (which may be readily and cheaply accomplished by ordinary and known methods) then dissolving it in a light mineral oil (producing opalescent turbid solution) and then filtering the solution through heavy filter paper. The ephedrine-oil solution at full ephedrine strength will pass through the filter as a transparent liquid and the water content which has caused the turbidity will be retained by the filter.

In practice the following formula and procedure has been found to give the desired results at relatively low cost:

Place 593 lbs., 7 oz., 138 grains of light mineral oil (liquid petrolatum) in a glass-lined, steam-jacketed kettle and heat to 140° F., then add 6 lbs., 2 oz., 325 grains of ephedrine alkaloid which has been dried to approximately 97% purity. Agitate the mixture by stirring for a short time to assure solution of the alkaloid. Cool the mixture to room temperature and add 1.84 grams of an oil-soluble red dye (which is inactive upon mucous membranes) and filter through heavy filter paper.

The filtrate, when analyzed, will be found to contain the calculated 1% of ephedrine alkaloid which exists, by reason of the proportion of the alkaloid specified above, in the opalescent turbid solution before filtration.

To the filtrate add 5 fluid ounces and 192 minims of oil of rose, which will not alter the clearness or transparency of the liquid.

The oil of rose when combined with the clear ephedrine-oil solution produces an inhalant which is slightly anesthetic to the mucous membranes as well as vaso-constrictant.

The application of heat, as above described, is not essential, but it reduces the time required for complete solution of the alkaloid.

Preliminary reduction of the water content of the ephedrine alkaloid to approximately 3%, as specified above, is not absolutely essential but such reduction can be easily attained by readily applied methods and at small cost, and such procedure materially facilitates the filtration step.

The dye is added primarily for the purpose of identifying the product as my product and, so far as I know, has no pathological effect.

I claim as my invention:

1. A solution of ephedrine in oil; comprising a mineral oil, ephedrine as one substance dissolved therein, and oil of rose as another substance dissolved therein.

2. A solution of ephedrine in oil; comprising a mineral oil, ephedrine as one substance dissolved therein, and oil of rose as another substance dissolved therein, and substantially free from water.

3. A solution of ephedrine in oil; comprising mineral oil mixed with a small amount of oil of rose, and about 1% of ephedrine alkaloid dissolved therein.

In witness whereof, I, EDGAR B. CARTER, have hereunto set my hand at Indianapolis, Indiana, this 19th day of July, A. D. one thousand nine hundred and twenty-eight.

EDGAR B. CARTER.